(12) United States Patent
Liu

(10) Patent No.: US 7,580,945 B2
(45) Date of Patent: Aug. 25, 2009

(54) LOOK-AHEAD DOCUMENT RANKING SYSTEM

(75) Inventor: Tie-Yan Liu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 287 days.

(21) Appl. No.: 11/694,464

(22) Filed: Mar. 30, 2007

(65) Prior Publication Data

US 2008/0243813 A1   Oct. 2, 2008

(51) Int. Cl.
*G06F 17/00* (2006.01)

(52) U.S. Cl. .................. 707/102; 707/100; 707/101; 707/3; 707/104.1

(58) Field of Classification Search ............... 707/5–7, 707/100–102, 3, 104.1
See application file for complete search history.

(56) References Cited

U.S. PATENT DOCUMENTS

| | | | |
|---|---|---|---|
| 7,089,252 | B2 | 8/2006 | Tomlin et al. |
| 7,356,530 | B2 * | 4/2008 | Kim et al. ............... 707/7 |
| 2005/0060297 | A1 | 3/2005 | Najork |
| 2005/0165757 | A1 | 7/2005 | Broder |
| 2005/0198026 | A1 * | 9/2005 | Dehlinger et al. ........ 707/5 |
| 2006/0004809 | A1 | 1/2006 | Zhang et al. |
| 2006/0004811 | A1 | 1/2006 | McSherry |
| 2006/0036598 | A1 | 2/2006 | Wu |
| 2006/0041553 | A1 | 2/2006 | Paczkowski et al. |
| 2006/0235841 | A1 | 10/2006 | Betz et al. |
| 2006/0294124 | A1 | 12/2006 | Cho |

OTHER PUBLICATIONS

Craswell, Nick and David Hawking, "Overview of the TREC 2003 Web Track," Mar. 22, 2004, 12th TREC 2003, pp. 1-15.

Eirinaki, Magdalini, Michalis Vazirgiannis and Dimitris Kapogiannis, "Web Path Recommendations based on Page Ranking and Markov Models," WIDM'05, Nov. 5, 2005, Bremen, Germany, © 2005 ACM.

Haveliwala, Taher H., "Efficient Computation of PageRank," Oct. 18, 1999, Stanford University.

Kleinberg, Jon M., "Authoritative Sources in a Hyperlinked Environment," Journal of the ACM, vol. 46, No. 5, Sep. 1999, © 1999 ACM, pp. 604-632.

Ng, Andrew Y., Alice X. Zheng and Michael I. Jordan, "Link Analysis, Eigenvectors and Stability," IJCAI, 2001, 8 pages.

Page, L. et al., "The PageRank Citation Ranking: Bringing Order to the Web," Jan. 29, 1998, Stanford University Technical Report, pp. 1-17.

Robertson, S.E., "Overview of the Okapi Projects," Journal of Documentation, vol. 53, No. 1, Jan. 1997, pp. 3-7.

Wu, Jie and Karl Aberer, "Using a Layered Markov Model for Distributed Web Ranking Computation," Proceedings of the 25th IEEE International Conference on Distributed Computing Systems (ICSCS'05), © 2005 IEEE.

* cited by examiner

*Primary Examiner*—Sana Al-Hashemi
(74) *Attorney, Agent, or Firm*—Perkins Coie LLP

(57) ABSTRACT

A method and system is provided for calculating importance of documents based on transition probabilities from a source document to a target document based on looking ahead to information content of target documents of the source document. A look-ahead importance system generates transition probabilities of transitioning between any pair of source and target documents based on analysis of links to target documents of the source document. The system may calculate the transition probabilities based on the number of links on documents a look-ahead distance away. The system then solves for the stationary probabilities of the transition probabilities. The stationary probabilities represent the importance of the documents.

20 Claims, 5 Drawing Sheets

LOOK-AHEAD DOCUMENT RANKING SYSTEM

BACKGROUND

Many search engine services, such as Google and Yahoo, provide for searching for information that is accessible via the Internet. These search engine services allow users to search for display pages, such as web pages, that may be of interest to users. After a user submits a search request (i.e., a query) that includes search terms, the search engine service identifies web pages that may be related to those search terms. To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on. The search engine service identifies web pages that may be related to the search request based on how well the keywords of a web page match the words of the query. The search engine service then displays to the user links to the identified web pages in an order that is based on a ranking that may be determined by their relevance to the query, popularity, importance, and/or some other measure.

One well-known technique for page ranking is PageRank, which is based on the principle that web pages will have links to (i.e., "out links") important web pages. The importance of a web page is based on the number and importance of other web pages that link to that web page (i.e., "in links"). PageRank is based on a random surfer model of visiting web pages of a web graph (vertices representing web pages and links representing hyperlinks) and represents the importance of a web page as the stationary probability of visiting that web page. In the random surfer model, a surfer visiting a current page will visit a next page by randomly selecting a link of the current web page. If the current web page has three out links to target web pages, then the probability of visiting each target web page from the current web page is ⅓. PageRank is thus based on a Markov random walk that only depends on the information (e.g., hyperlink) of the current web page.

A web graph may be represented as G=<V, E>, where V={1, 2, ..., n} is the set of vertices and E={<i,j>|i,j ∈V} is the set of edges. The links between web pages can be represented by an adjacency matrix A, where $A_{ij}$ is set to one when there is an out link from a source web page i to a target web page j. The importance score $w_j$ for web page j can be represented by the following:

$$w_j = \Sigma_i A_{ij} w_i \quad (1)$$

This equation can be solved by iterative calculations based on the following:

$$A^T w = w \quad (2)$$

where w is the vector of importance scores for the web pages and is the principal eigenvector of $A^T$.

PageRank may also factor in that a surfer may randomly select a web page to visit next that is not linked to by the current web page. Thus, the surfer may next visit a target web page of the current web page with a probability of α and next visit a randomly selected web page with a probability of 1−α.

To factor in this random selection of web pages, PageRank generates an initial transition matrix P by normalizing each non-zero row of the adjacency matrix with the sum of its elements. PageRank then sets each element of a zero row in matrix P to 1/n to generate transition probability matrix $\overline{P}$. The model of representing the random selection of links of target web pages and the random selection of web pages can be represented by the following:

$$\overline{\overline{P}} = \alpha \overline{P} + (1-\alpha) U \quad (3)$$

where $\overline{\overline{P}}$ is the combined transition probability matrix and U is a uniform probability distribution matrix in which each element is set to 1/n. PageRank considers the stationary distribution $\pi = (\pi_1, \pi_2, \ldots, \pi_n)^T$ of the transition probability matrix $\overline{\overline{P}}$ to represent the importance of each web page. PageRank may compute the stationary distribution through an iterative process as represented by the following:

$$\pi(t+1) = (\overline{\overline{P}})^T \pi(t) \quad (4)$$

where $\pi(0) = (1, 1, \ldots, 1)_n^T$, t represents the iteration count, and the iterative process continues until π converges on a solution.

A fundamental assumption of PageRank is that a user randomly selects any of the hyperlinks on the current web page. This assumption is, however, incorrect when the user has additional information available to help in deciding which hyperlink to select. A user presumably wants to maximize their information gain and so a user with this additional information will likely select the hyperlink that will lead to the maximum information gain.

SUMMARY

A method and system is provided for calculating importance of documents based on transition probabilities from a source document to a target document based on looking ahead to information content of target documents of the source document. A look-ahead importance system generates transition probabilities of transitioning between any pair of source and target documents based on analysis of links to target documents of the source document. The look-ahead importance system may calculate the transition probability from a source document to a direct target document based on content of documents a certain look-ahead distance away. The look-ahead importance system may calculate the transition probabilities based on the number of links on documents a look-ahead distance away. After the look-ahead importance system generates a transition probability matrix from these transition probabilities, it solves for the stationary probabilities of visiting each document. The stationary probabilities of the documents represent the importance of the documents.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
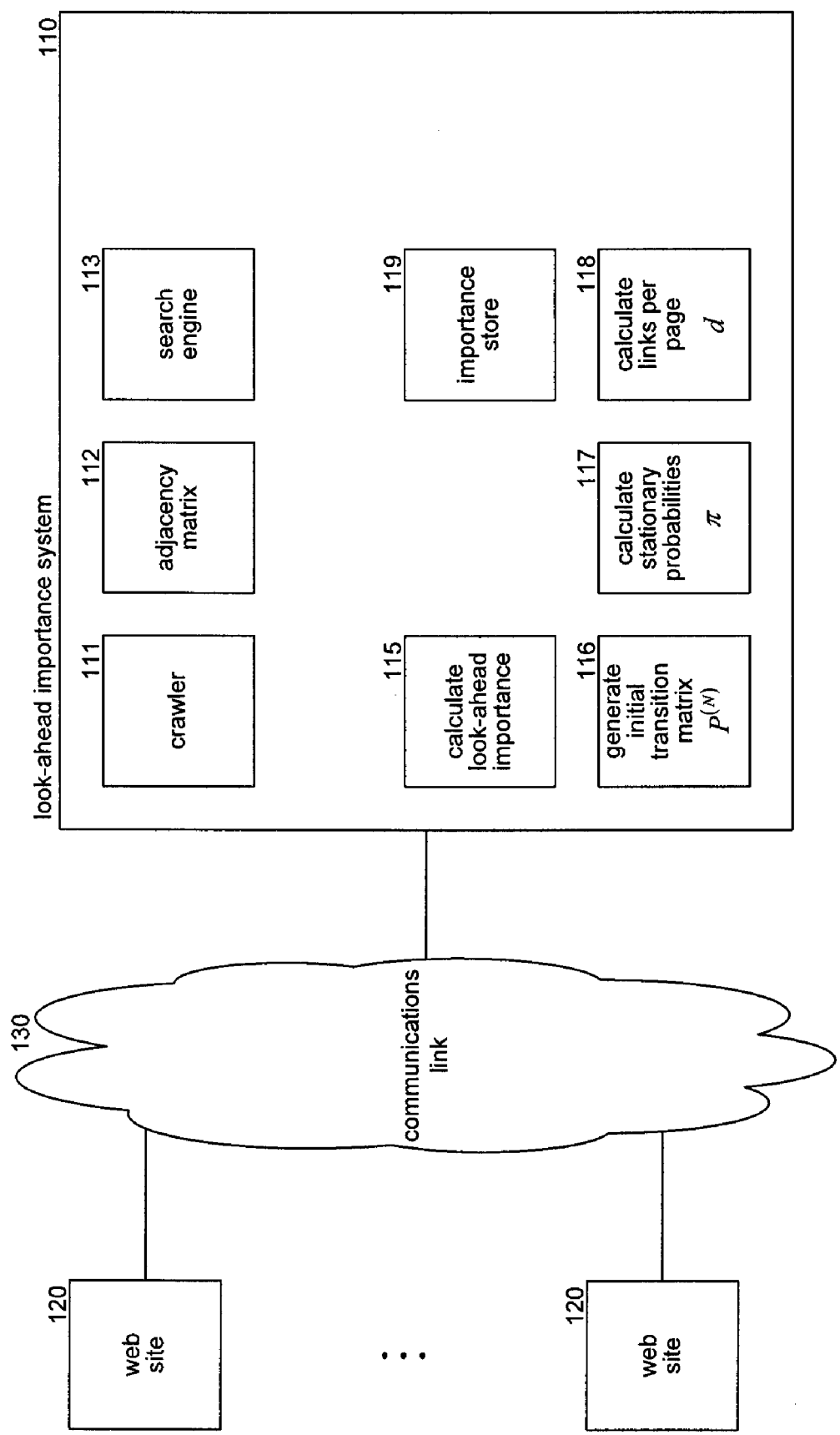
FIG. 1 is a block diagram that illustrates components of the look-ahead importance system in one embodiment.

A method and system is provided for calculating importance of documents based on transition probabilities from a source document to a target document based on looking ahead to information content of target documents of the source document. In one embodiment, a look-ahead importance system generates transition probabilities of transitioning between any pair of source and target documents based on analysis of links to target documents of the source document. Documents that are directly or indirectly accessible through a link of a source document are target documents of the source document. For example, a document a may contain links to documents b, c, and d; and document b may contain links to documents b' and b''. Document a is a source document for direct target documents b, c, and d and a source document for indirect target documents b' and b''. Document b is a source document for direct target documents b' and b''. Documents b, c, and d are a look-ahead distance of one from source document a, and documents b' and b'' are a look-ahead distance of two from source document a. The look-ahead importance system may calculate the transition probability from a source document to a direct target document based on content of documents a certain look-ahead distance away. For example, if the target documents b, c, and d each contain 2, 3, and 4 links, respectively, then the transition probability of transitioning from source document a to target documents b, c, and d based on a look-ahead distance of one may be 2/9, 3/9, and 4/9, respectively. Since the documents b, c, and d contain a total of 9 links, the transition probability for any target document is the fraction of the total number of links that it contains. Thus, the look-ahead importance system calculates the transition probabilities based on the number of links on documents a look-ahead distance away. After the look-ahead importance system generates a transition probability matrix from these transition probabilities, it solves for the stationary probabilities of visiting each document. The stationary probabilities of the documents represent the importance of the documents. In this way, the look-ahead importance system determines the importance of documents factoring in the relative amount of information that may be available through the different links of a source document.

Rather than randomly selecting a link of a current web page, a user may select links based on the perceived information gain of selecting one link over another link. The additional information needed to help a user make a determination of the information gain can be provided in various ways. For example, a web page may be augmented to display for each link the percent of links that are a look-ahead distance away that are accessible through that link. When a user hovers a pointer over a link, the percent may display next to the link. Continuing with the example of document a with links to documents b, c, and d, when a pointer hovers over the link to document b, then 22% may be displayed next to the link. As another example, when a web page is displayed, a graphic can be displayed of a portion of the web graph (e.g., vertices and edges) that is a look-ahead distance from the current web page. A user can assess the displayed portion of the web graph to assess the information available through the various links.

One skilled in the art will appreciate that many different techniques may be used to generate the transition probabilities based on looking ahead. The technique described above sets the transition probability from a source web page to a direct target web page to be the fraction of the links accessible through the target web page at a particular look-ahead distance. Continuing with the example of document a with links to documents b, c, and d and document b with links to document b' and b'', if the look-ahead distance is two and documents b' and b'' contain 2 and 5 links, respectively, and the total number of links on direct target documents of c is 14 and on direct target documents of d is 21, then the transition probability for document b will be 7/42, for document c will be 14/42, and for document d will be 21/42. An alternative technique may set the transition probability to a combination (e.g.; linear or non-linear) of the transition probabilities without looking ahead and the transition probabilities of looking ahead or a combination of transition probabilities of looking ahead different look-ahead distances. Continuing with the example, without looking ahead, the transition probabilities will be 1/3 for documents b, c, and d; and with a look-ahead distance of one, the transition probabilities will be 2/9, 3/9, and 4/9. A linear combination of the transition probabilities without and with looking ahead may be 2.5/9, 3/9, and 3.5/9.

In one embodiment, the look-ahead importance system represents the transition probability between web pages by the following:

$$P_{ij}^{(N)} = \frac{d_j^{(N-1)} 1_{\{(i,j) \in l(G)\}}}{\sum_{(i,k) \in l(G)} d_k^{(N-1)}} \quad (5)$$

where i represents a source web page, j represents a direct target web page, N−1 represents the look-ahead distance, and $d_j^{(N-1)}$ represents the number of links on the web pages through the target web page j at a look-ahead distance of N−1. Continuing with the example described above, target documents b, c, and d are a look-ahead distance of one away from source document a. Thus, $d_a^{(1)}$ is 3, $d_b^{(2)}$ is 2, $d_c^{(2)}$ is 3, $d_d^{(2)}$ is 4, and $d_b^{(3)}$ is 2, and the denominator of Equation 5 is the sum of these values. The look-ahead importance system may generate the initial transition matrix according to the following:

$$P^{(N)} = (D^{(N)})^{-1} A D^{(N-1)} \quad (6)$$

where $P^{(N)}$ represents the initial transition matrix based on a look-ahead distance of N−1, A represents an adjacency matrix indicating links between documents, and $D^{(N)}$ represents a diagonal matrix with diagonal elements set to $d^{(N)}$ where $d^{(N)}$ is calculated according to the following:

$$d^{(N)} = A d^{(N-1)} \quad (7)$$

where $d^{(0)} = (1, 1, \ldots, 1)_n^T$. The matrix $(D^{(N)})^{-1}$ is the extended inverse matrix with a zero value for any element whose corresponding element in $D^{(N)}$ is zero. The vector $d^{(N)}$ contains an element for each web page and contains the total number of links on web pages that are a look-ahead distance of N−1 from the web page.

The look-ahead importance system then sets each element of a zero row in $P^{(N)}$ to 1/n giving a transition probability matrix $\bar{P}^{(N)}$. The look-ahead importance system represents the random selection of direct target web pages via links and the random selection of web pages without selecting a link by the following:

$$\overline{P}^{(N)} = \alpha \overline{P}^{(N)} + (1-\alpha)U \qquad (8)$$

where $\overline{P}^{(N)}$ is the combined transition probability matrix and U is a uniform probability distribution matrix in which each element is set to 1/n. The look-ahead importance system represents the stationary probabilities as follows:

$$\pi^{(N)} = (\overline{P}^{(N)})^T \pi^{(N)} \qquad (9)$$

where $\pi^{(N)}$ represents the stationary probabilities with a look-ahead distance of N-1. The look-ahead importance system may calculate the stationary probabilities using an iterative process.

FIG. 1 is a block diagram that illustrates components of the look-ahead importance system in one embodiment. The look-ahead importance system 110 may be connected to web sites 120 via communications link 130. The look-ahead importance system may include a crawler component 111 that crawls the web pages of the web sites to generate an adjacency matrix 112. The adjacency matrix, which may be stored as a sparse matrix, indicates the links between the web pages and represents a web graph. The look-ahead importance system may also include a search engine component 113 that receives search requests, identifies web pages that match the search requests, and ranks the matching web pages based at least in part on the importance scores generated by the look-ahead importance system. The look-ahead importance system includes a calculate look-ahead importance component 115, a generate initial transition matrix (P) component 116, a calculate stationary probabilities ($\pi$) component 117, and a calculate links per page (d) component 118. The calculate look-ahead importance component invokes the generate initial transition matrix component to calculate the initial transition matrix and then generates the transition probability matrix. The generate initial transition matrix component invokes the calculate links per page component to generate for each source web page a total of the number of links on the web page that are a look-ahead distance away. The calculate look-ahead importance component invokes the calculate stationary probabilities component to calculate the stationary probabilities and stores the stationary probabilities as importance scores in an importance store 119.

The computing device on which the look-ahead importance system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the look-ahead importance system, which means a computer-readable medium that contains the instructions. In addition, the instructions, data structures, and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, hand-held or laptop devices, multiprocessor systems, microprocessor-based systems, programmable consumer electronics, digital cameras, network PCs, minicomputers, mainframe computers, computing environments that include any of the above systems or devices, and so on.

The look-ahead importance system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. For example, a separate computing system may crawl the web and generate the adjacency matrix. Also, the search engine may be hosted on a separate computing system.

Figure 2:
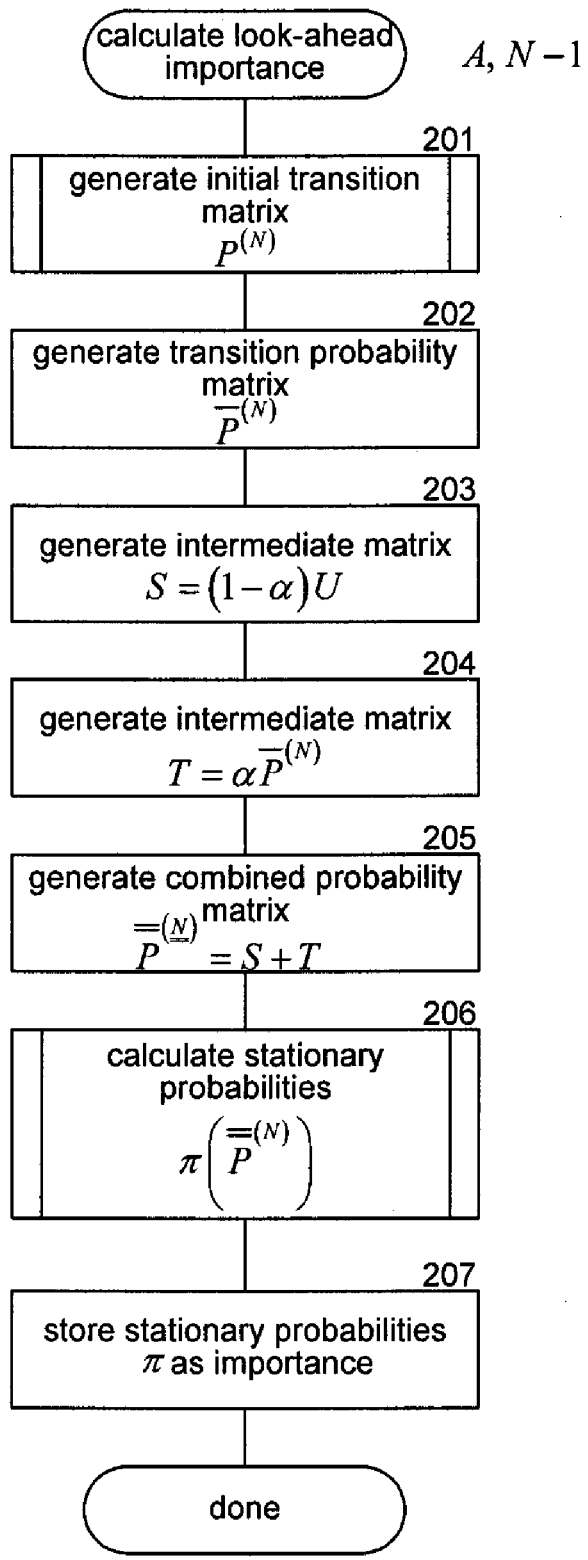
FIG. 2 is a flow diagram that illustrates the processing of the calculate look-ahead importance component of the look-ahead importance system in one embodiment.

FIG. 2 is a flow diagram that illustrates the processing of the calculate look-ahead importance component of the look-ahead importance system in one embodiment. The component is passed an indication of an adjacency matrix and an indication of the look-ahead distance. The component generates a transition probability matrix based on the passed look-ahead distance and stores the stationary probabilities of that transition probability matrix as the importance of the web pages. In block 201, the component invokes the generate initial transition matrix component to generate the initial transition matrix. In block 202, the component normalizes the values in the rows and sets the elements of any rows with all zero elements to have an equal probability to generate the transition probability matrix. In block 203, the component generates an intermediate matrix to factor in the probability of next visiting a web page by not selecting a link of the current web page weighted by the factor of 1-$\alpha$. In block 204, the component generates an intermediate matrix that weights the transition probability matrix by the factor of $\alpha$. In block 205, the component combines the intermediate matrixes to generate the combined transition probability matrix with a look-ahead distance of N-1. In block 206, the component invokes the calculate stationary probabilities component to calculate the stationary probabilities of the transition probability matrix. In block 207, the component stores the stationary probabilities in the importance store as the importance of each web page and then completes.

Figure 3:
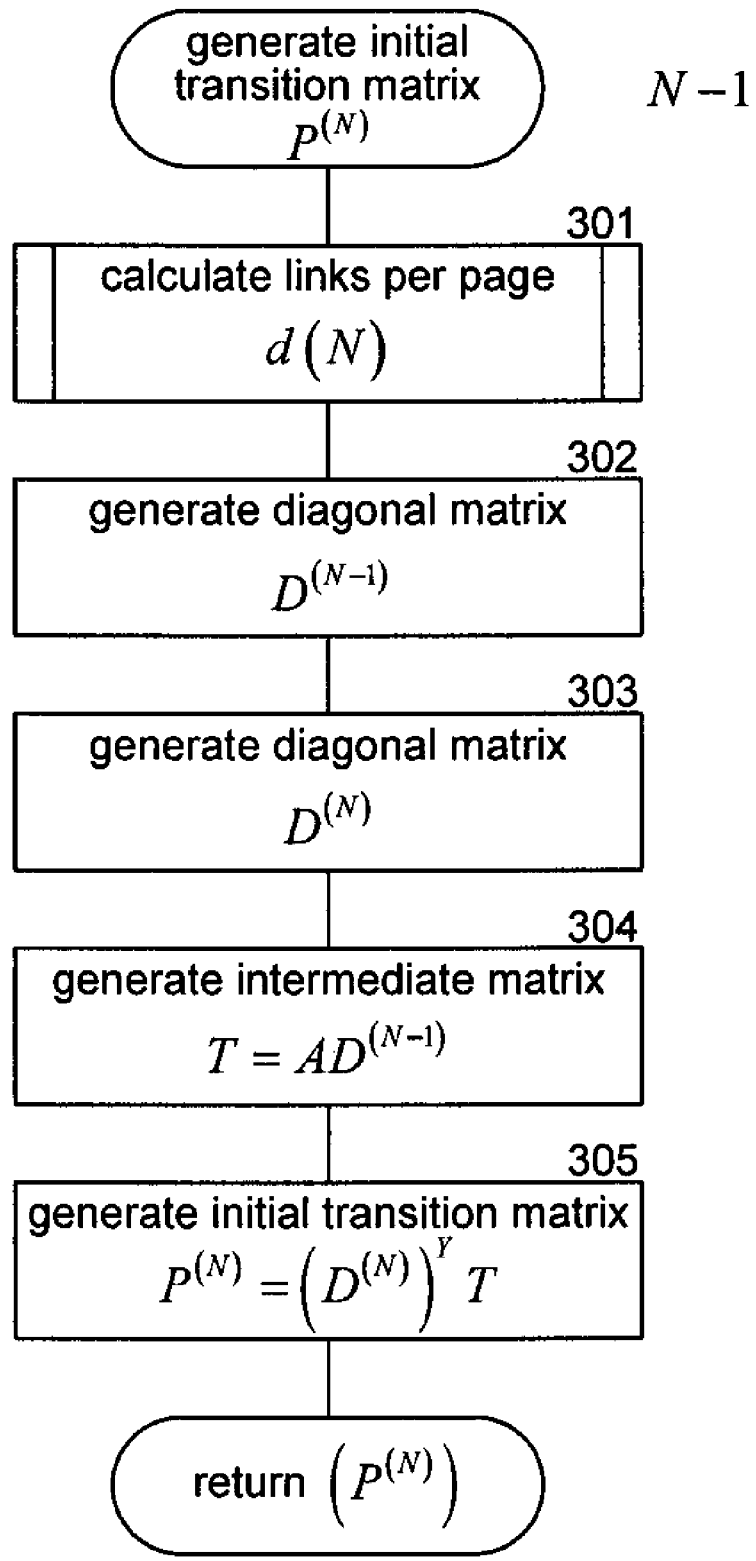
FIG. 3 is a flow diagram that illustrates the processing of the generate initial transition matrix component of the look-ahead importance system in one embodiment.

FIG. 3 is a flow diagram that illustrates the processing of the generate initial transition matrix component of the look-ahead importance system in one embodiment. The component is passed an indication of the look-ahead distance and generates the initial transition matrix. In block 301, the component invokes the calculate links per page component to generate the vectors $d^{(N)}$ and $d^{(N-1)}$. In block 302, the component generates the matrix $D^{(N-1)}$ as a diagonal matrix with the diagonal elements of $d^{(N-1)}$. In block 303, the component generates the matrix $D^{(N)}$ as a diagonal matrix with the diagonal elements of $d^{(N)}$. In block 304, the component generates the intermediate matrix T by multiplying the adjacency matrix A by the matrix $D^{(N-1)}$. In block 305, the component generates the initial transition matrix by multiplying the inverse of $D^{(N)}$ by the intermediate matrix T. The component then returns the initial transition matrix.

Figure 4:
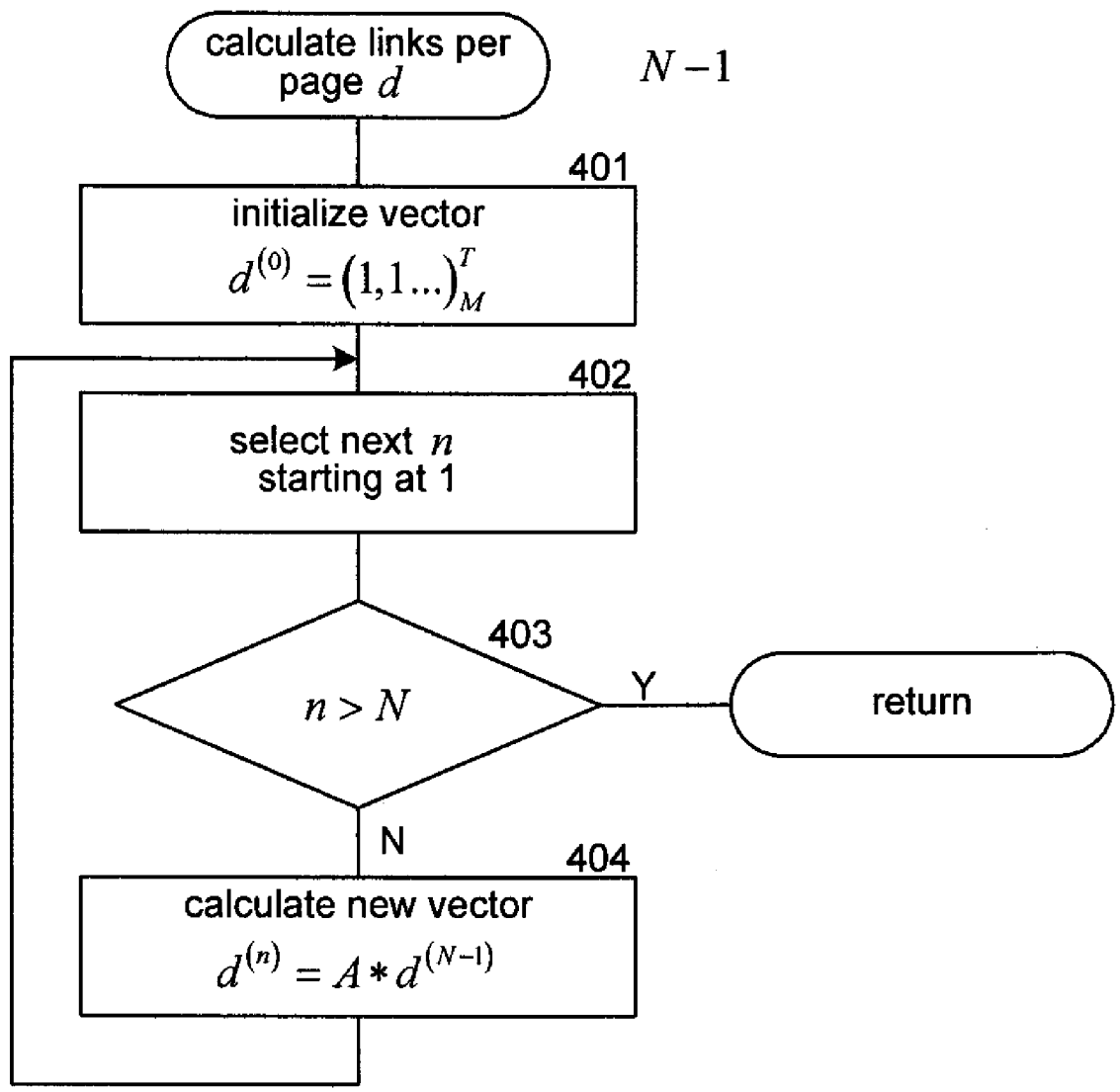
FIG. 4 is a flow diagram that illustrates the processing of the calculate links per page component of the look-ahead importance system in one embodiment.

FIG. 4 is a flow diagram that illustrates the processing of the calculate links per page component of the look-ahead importance system in one embodiment. The component is passed an indication of the look-ahead distance and calculates the counts of the links on the target web pages that are the look-ahead distance from source web pages. In block 401, the component initializes the vector d(0). In blocks 402-404, the component loops calculating the counts for each web page. In block 402, the component increments an index. In decision block 403, if the index is greater than the look-ahead distance plus one, then the component returns the last two calculated vectors, else the component continues at block 404. In block 404, the component multiplies the adjacency matrix by the last calculated vector to give the next calculated vector and loops to block 401 to increment the index.

Figure 5:
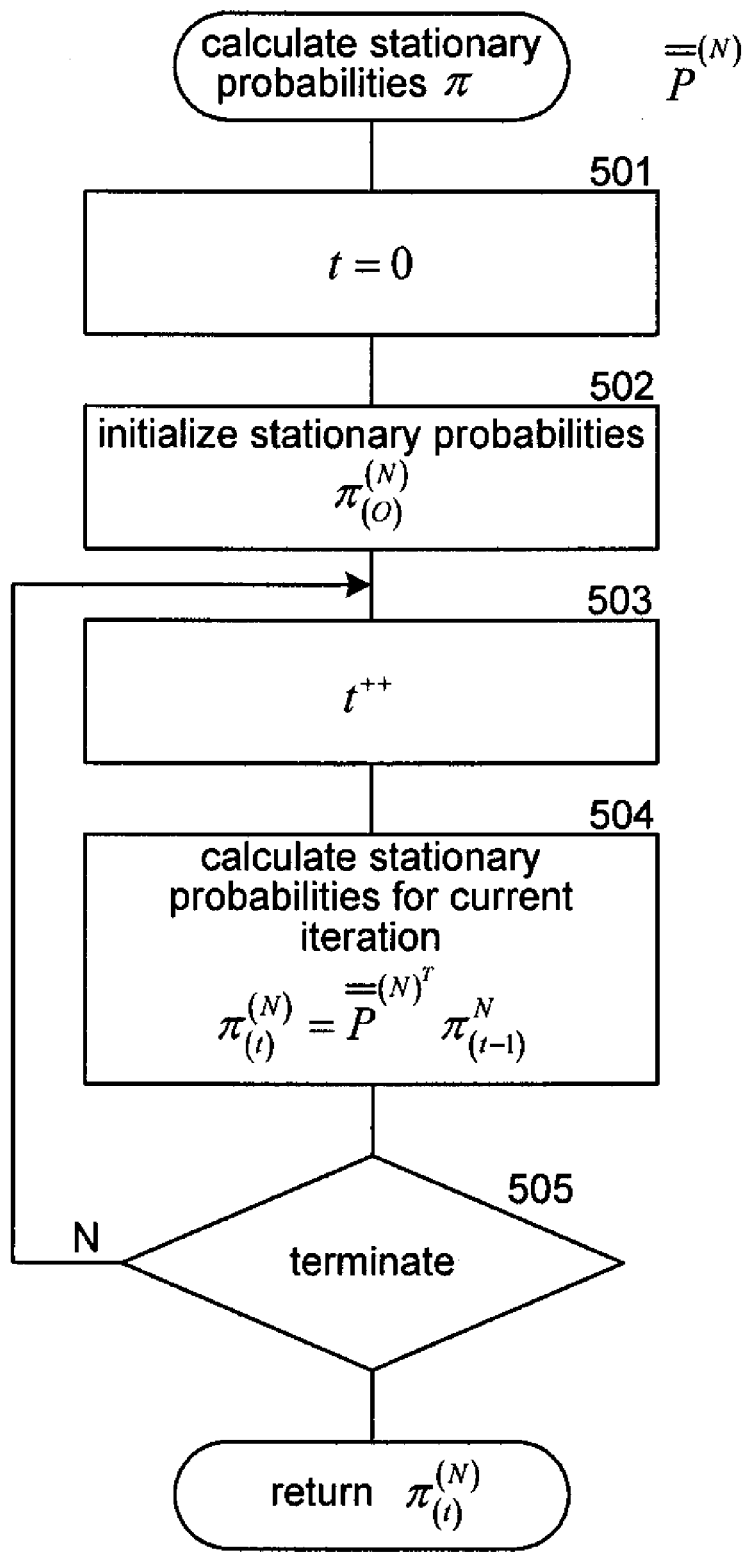
FIG. 5 is a flow diagram that illustrates the processing of the calculate stationary probabilities component of the look-ahead importance system in one embodiment.

FIG. 5 is a flow diagram that illustrates the processing of the calculate stationary probabilities component of the look-ahead importance system in one embodiment. The component is passed the probability transition matrix and calculates the corresponding stationary probabilities for each web page. In block 501, the component initializes an iteration variable t. In block 502, the component initializes the stationary probabilities. In blocks 503-505, the component loops calculating new stationary probabilities until a termination condition is satisfied. In block 503, the component increments to the next iteration. In block 504, the component calculates the stationary probabilities for the current iteration by multiplying a transform of the transition probability matrix by the stationary probabilities of the last iteration. In decision block 505, if a termination condition is satisfied, such as that the stationary probabilities have converged on a solution or a certain number of iterations have been performed, then the component returns the stationary probabilities, else the component loops to block 503 to increment to the next iteration.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. One skilled in the art will appreciate that a document can include any information content that contains links or otherwise identifies other content. For example, a document may be a web page with links to other web pages, a scholarly article with citations to other scholarly articles, a judicial opinion with citations to other judicial opinions, a patent with citations to other patents, and so on. Accordingly, the invention is not limited except as by the appended claims.

I claim:

1. A method in a computing device for determining scores of documents with links between documents, the method comprising:
   generating transition probabilities of transitioning between pairs of source and target documents based on a determination of information available through each target document of a source document by factoring in information content of the target documents;
   calculating by the computing device scores of the documents based on the stationary probability of the generated transition probabilities; and
   storing the calculated scores of the documents
   wherein the generated transition probabilities are represented by an initial transition matrix that is calculated according to the following:

$$P^{(N)} = (D^{(N)})^{-1} A D^{(N-1)}$$

where $P^{(N)}$ represents the initial transition matrix based on a look-ahead distance of N−1, A represents an adjacency matrix indicating links between documents, and $D^{(N)}$ represents a diagonal matrix with diagonal elements set to $d^{(N)}$, where $d^{(N)}$ is calculated according to the following:

$$d^{(N)} = A d^{(N-1)}$$

where $d^{(0)} = (1, 1, \ldots, 1)_n^T$.

2. The method of claim 1 wherein the generating of the transition probabilities includes factoring in transitioning from a source document to another document without selecting a link of the source document.

3. The method of claim 1 wherein the generating of the transition probabilities includes generating a transition probability matrix.

4. The method of claim 1 including converting the initial transition matrix into a transition probability matrix by normalizing elements of each row by the sum of the elements in the row.

5. A method in a computing device for determining scores of documents with links between documents, the method comprising:
   generating transition probabilities of transitioning between pairs of source and target documents based on a determination of information available through each target document of a source document by factoring in information content of the target documents;
   calculating by the computing device scores of the documents based on the stationary probability of the generated transition probabilities; and
   storing the calculated scores of the documents
   wherein transition probabilities are generated according to the following:

$$P_{ij}^{(N)} = \frac{d_j^{(N-1)} 1_{\{(i,j) \in l(G)\}}}{\sum_{(i,k) \in l(G)} d_k^{(N-1)}}$$

where $P_{ij}^{(N)}$ represents the transition probability of transitioning from document i to document j based on a look-ahead distance of N−1 and $d_j^{(N-1)}$ represents the count of links from document j that is a look-ahead distance of N−1 from document i.

6. The method of claim 5 wherein the calculating of scores is performed iteratively until the stationary probabilities of the documents converge on a solution.

7. The method of claim 5 wherein the transition probabilities are represented as a transition probability matrix and the calculating of the score is performed by identifying the principal eigenvector of the transition probability matrix.

8. The method of claim 5 including ranking documents based on the calculated scores.

9. The method of claim 5 wherein the documents are web pages of a search result for a search request and the web pages are ranked based on relevance to the search request and calculated scores.

10. The method of claim 1 wherein a transition probability of transitioning between a source document and a target document is based on number of links on documents that are a look-ahead distance from the source document.

11. A computer-readable storage medium encoded with instructions for controlling a computing device to rank web pages with hyperlinks to other web pages, by a method comprising:
   generating transition probabilities of transitioning between pairs of a source web page and a direct target web page based on information available through each target web page of the source web page by factoring in information content of the target web pages;

calculating scores of the web pages based on a stationary probability of the generated transition probabilities;

searching for web pages to be included in a search result for a search request; and ranking web pages of the search result based on the calculated scores wherein the generated transition probabilities are represented by an initial transition matrix that is calculated according to the following:

$$P^{(N)} = (D^{(N)})^{-1} A D^{(N-1)}$$

where $P^{(N)}$ represents the initial transition matrix based on a look-ahead distance of N−1, A represents an adjacency matrix indicating links between documents, and $D^{(N)}$ represents a diagonal matrix with diagonal elements set to $d^{(N)}$, where $d^{(N)}$ is calculated according to the following:

$$d^{(N)} = A d^{(N-1)}$$

where $d^{(0)} = (1, 1, \ldots, 1)_n^T$.

12. The computer-readable storage medium of claim 11 wherein the generating of the transition probabilities includes factoring in transitioning from one web page to another web page without selecting a hyperlink.

13. The computer-readable storage medium of claim 11 wherein the generating of the transition probabilities includes generating a transition probability matrix.

14. The computer-readable storage medium of claim 11 wherein the calculating of scores is performed iteratively until the stationary probabilities of the web pages converge on a solution.

15. The computer-readable storage medium of claim 11 wherein the transition probabilities are represented as a transition probability matrix and the calculating of scores is performed by identifying a principal eigenvector of the transition probability matrix.

16. The computer-readable storage medium of claim 11 wherein the web pages are ranked based on relevance to the search request.

17. A computing device for calculating scores of web pages with hyperlinks to other web pages, comprising:

a component that generates transition probabilities of transitioning between pairs of web pages by factoring in information content of target web pages;

a component that calculates scores of the web pages based on a stationary probability of the transition probabilities; and a component that ranks web pages based on the calculated scores wherein transition probabilities are generated according to the following:

$$P_{ij}^{(N)} = \frac{d_j^{(N-1)} 1_{\{(i,j) \in l(G)\}}}{\sum_{(i,k) \in l(G)} d_k^{(N-1)}}$$

where $P_{ij}^{(N)}$ represents the transition probability of transitioning from document i to document j based on a look-ahead distance of N−1 and $d_j^{(N-1)}$ represents the count of links from document j that is a look-ahead distance of N−1 from document i and wherein the components are implemented as instructions stored in memory of the computing device for execution by a processor of the computing device.

18. The computing device of claim 17 wherein the component that generates the transition probabilities factors in transitioning from one web page to another web page without selecting a hyperlink.

19. The computing device of claim 17 wherein a transition probability of transitioning from a source web page to a direct target web page is based on information available through each direct target web page of a source web page by factoring in information content of target web pages.

20. The method of claim 1 including ranking documents based on the calculated scores.

\* \* \* \* \*